(12) United States Patent
Nalla et al.

(10) Patent No.: US 7,916,580 B2
(45) Date of Patent: Mar. 29, 2011

(54) MAINTAINING DATE AND TIME WITH TIME ZONE RULE CHANGES

(75) Inventors: Amar Nalla, Redmond, WA (US); Srikanth R. Avadhanam, Redmond, WA (US); Edvardas V. Budrys, Carnation, WA (US); Gandhinath Swaminathan, Kent, WA (US); Vijay B. Kurup, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 472 days.

(21) Appl. No.: 12/020,742

(22) Filed: Jan. 28, 2008

(65) Prior Publication Data

US 2009/0193048 A1    Jul. 30, 2009

(51) Int. Cl.
*G04B 19/22*    (2006.01)

(52) U.S. Cl. .......................................... 368/21

(58) Field of Classification Search .................... 368/21, 368/22; 705/8, 9
See application file for complete search history.

(56) References Cited

U.S. PATENT DOCUMENTS

| | | | |
|---|---|---|---|
| 4,180,969 A * | 1/1980 | Naito | 368/21 |
| 4,681,460 A * | 7/1987 | Nishimura | 368/21 |
| 4,866,611 A * | 9/1989 | Cree et al. | 708/112 |
| 5,845,257 A * | 12/1998 | Fu et al. | 705/8 |
| 5,920,824 A * | 7/1999 | Beatty et al. | 455/425 |
| 2002/0145944 A1* | 10/2002 | Wright | 368/21 |
| 2007/0121425 A1* | 5/2007 | Eble et al. | 368/21 |
| 2007/0147175 A1* | 6/2007 | Punkka | 368/21 |
| 2007/0201311 A1* | 8/2007 | Olson | 368/29 |
| 2008/0056072 A1* | 3/2008 | Chen | 368/46 |
| 2009/0168609 A1* | 7/2009 | Weir et al. | 368/21 |

* cited by examiner

*Primary Examiner* — Vit W Miska
(74) *Attorney, Agent, or Firm* — Perkins Coie LLP

(57) ABSTRACT

A method and system for maintaining date and time information correctly across rule changes for time zones is provided. A time maintenance system provides rules for converting dates and times between various time zones and a common time zone. When the time maintenance system receives a date and time in a designated time zone, it converts the date and time to a date and time in the common time zone based on a provided rule. The time maintenance system then stores the converted date and time along with an identification of the rule used to convert the date and time to the common time zone. The time maintenance system may then receive an indication of an overriding rule that overrides an existing rule for converting a date and time between the designated time zone and the current time zone. The time maintenance system then updates the stored date and time when the rule has been overridden in such a way as to indicate that the original date and time is no longer correct and to indicate the new rule.

19 Claims, 6 Drawing Sheets rules table 200

| time zone | rule id | year | standard | | | daylight | | |
|---|---|---|---|---|---|---|---|---|
| | | | date | time | offset | date | time | offset |
| eastern | 201 | 2007 | 2007-11-04 Sunday | 2:00 A.M. | -5 | 2007-03-11 Sunday | 2:00 A.M. | -4 |
| eastern | 202 | 2006 | 2006-10-29 Sunday | 2:00 A.M. | -5 | 2006-04-02 Sunday | 2:00 A.M. | -4 |

*FIG. 2*

MAINTAINING DATE AND TIME WITH TIME ZONE RULE CHANGES

BACKGROUND

Many organizations use enterprise-wide business applications to help conduct the operations of the organizations. These organizations have global operations with employees, suppliers, subcontractors, customers, competitors, government entities, and so on that are located throughout the world. The organizations use the business applications to track various types of information needed for the operations of the organizations. The organizations may track information including supply order and delivery information, product order and delivery information, scheduled meeting information, planning information, and so on. Often associated with such information is date and time information. It has been traditionally difficult to ensure that the date and time information is consistent across all time zones.

Some business applications provide very little support for handling the difficulties associated with operations that span multiple time zones. For example, a business application may store all date and time information in the local time zone of the person or computer that specified the date and time. As an example, a person in the Eastern time zone of the United States may enter a date and time into a business application, and the business application may simply store the date and time for the local time zone. Users of the business application who are not in the Eastern time zone might not know the actual time zone associated with the date and time of the meeting. If meetings were scheduled with people in other time zones, their calendars might be updated without taking into consideration time zone differences. So, for example, a meeting scheduled to start at 11 a.m. by someone in the Eastern time zone would appear to someone in the Pacific time zone of the United States to start at 11 a.m. Pacific time, rather than at the correct time of 8 a.m. Pacific time.

Other business applications may provide support for the different time zones of the users. For example, a calendaring application may track the date and time along with the time zone of the person who scheduled the meeting. Each person who is invited to the meeting would receive an electronic mail invitation with the start time of the meeting adjusted to that person's time zone. For example, the business application may track the local time zone of each person and adjust the date and time of an invitation to reflect the start time of the meeting in the local time zone of the invited person.

In addition to tracking the local time zone of each user, a business application may store rules indicating the effective dates and times of standard time and daylight saving time for each year for each time zone. The Olson database (named after contributor Arthur David Olson) and the system registry of MICROSOFT WINDOWS contain time zone rules intended for use by computer programs to adjust dates and times to account for differences in time zones. Each rule may also indicate an offset to add to a common time zone (e.g., Coordinated Universal Time ("UTC") or Greenwich Mean Time ("GMT")) to get the corresponding time for the time zone of the rule. For example, a rule for the Eastern time zone would indicate that the offset from UTC would be –5 hours effective at the start of standard time and –4 hours effective at the start of daylight saving time. So, a meeting scheduled for 1 P.M. GMT would be scheduled for 8 a.m. Eastern time if standard time was in effect on the day of the meeting.

An organization may need to specify the date and time of a meeting or other event far in advance. For example, a supervisor may schedule a recurring weekly telephone conference with subordinates located throughout the world for the next several years. Although the business application may add the meeting to each subordinate's calendar at the correct time for the subordinate's time zone, the rules for effective dates and times for daylight saving time or their corresponding offsets may change over time. As an example, in 2005 the United States decided to go to extended daylight saving time effective in 2007. Prior to 2007, the rule had been that daylight saving time was effective from the first Sunday in April until the last Sunday in October. However, after 2007, the rule is that daylight saving time is effective from the second Sunday in March until the first Sunday in November. Because of the change in the rule, meetings that were scheduled for 2007 using the old rule for a date that was previously during standard time, but was now during daylight saving time, would be scheduled for the incorrect time. For example, a recurring meeting scheduled for Monday, Mar. 12, 2007 at 1 p.m. GMT would be added to the calendar of a person in the Eastern time zone for 8 a.m. Eastern standard time according to the old rule. However, with the new rule, the recurring meeting would actually be held at 9 a.m. Eastern daylight time. As a result, the time for the meeting would be incorrect in the calendar for all those affected by the extended daylight saving time. Unfortunately, this change in the rule and other changes in rules cause significant confusion among users. In particular, a user may not know whether a date and time was set under the old or new rule and thus would not know the correct time of a meeting. Even if the user knew the correct time for a meeting and corrected the time on the calendar, other users trying to trying to schedule meetings with that user would not know if that user's calendar was correct and would not know the actual availability of that user.

SUMMARY

A method and system for maintaining date and time information correctly across rule changes for time zones is provided. A time maintenance system provides rules for converting dates and times between various time zones and a common time zone. The time maintenance system also stores an indication of a designated time zone for each user. When the time maintenance system receives a date and time in the designated time zone, it converts the date and time to a date and time in the common time zone based on a provided rule. The time maintenance system then stores the date and time along with an identification of the rule used to convert the date and time to the common time zone. The time maintenance system may then receive an indication of an overriding rule that overrides an existing rule for converting a date and time between the designated time zone and the current time zone. The time maintenance system then retrieves the stored date and time along with the identified rule and determines whether it needs to be updated. If the date and time need updating, the time maintenance system adjusts the date and time and the stores the updated date and time along with an identification of the new rule.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2 is a diagram that illustrates the data of the rules table of the time maintenance system in some embodiments.

DETAILED DESCRIPTION

Figure 1:
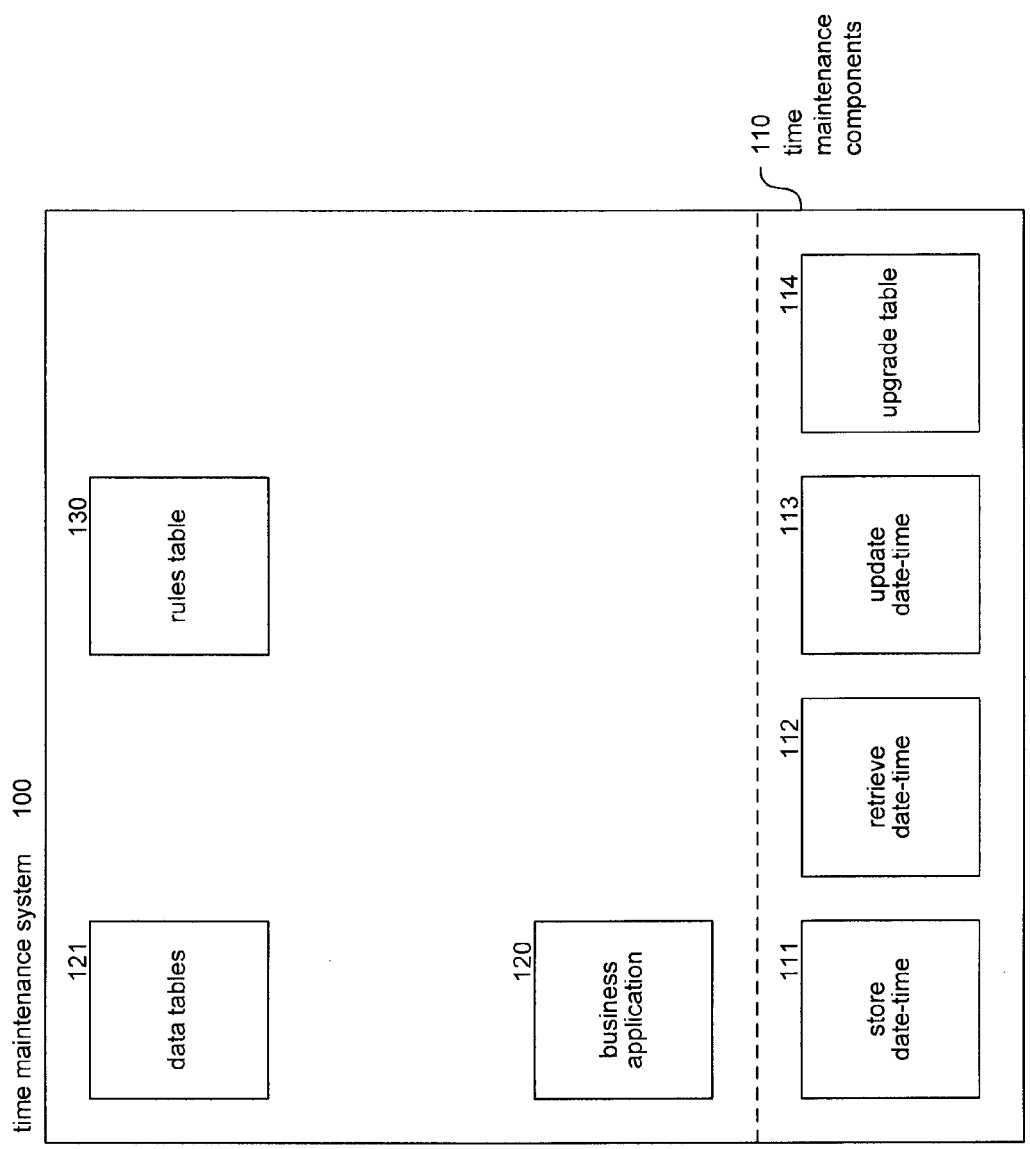
FIG. 1 is a block diagram that illustrates the components of the time maintenance system in some embodiments.

A method and system for maintaining date and time information correctly across rule changes for time zones is provided. In some embodiments, a time maintenance system provides rules for converting dates and times between various time zones and a common time zone (e.g., UTC). The rules may be stored in the format of the Olson database. The time maintenance system also stores an indication of a designated time zone for each user. For example, a user on the West Coast of the United States would be designated as being in the Pacific time zone, and a user on the East Coast of the United States would be designated as being in the Eastern time zone. When the time maintenance system receives a date and time in the designated time zone, it converts the date and time to a date and time in the common time zone based on a provided rule. For example, if the designated time zone is the Eastern time zone and the time is 8 a.m. when standard time is effective and the common time zone is UTC, then the time maintenance system converts the time to 1 p.m. UTC. The time maintenance system then stores the date and time along with an identification of the rule used to convert the date and time to the common format. For example, if the date is within 2007 and the date and time was converted to UCT using non-extended daylight saving time, then the identified rule would indicate the non-extended daylight saving time rule. The time maintenance system may then receive an indication of an overriding rule that overrides an existing rule for converting a date and time between the designated time zone and the current time zone. For example, the time maintenance system may receive a rule defining that the extended daylight saving time for 2007 is to override the previous rule defining non-extended daylight saving time for 2007. The time maintenance system then retrieves the stored date and time along with the identified rule and determines whether it needs to be updated. For example, the time maintenance system determines that the date and time need updating when the date and time are within the extension of the extended daylight saving time and were converted to the common time zone using the overridden rule. If the date and time need updating, the time maintenance system adjusts the date and time and then stores the updated date and time along with an identification of the new rule. Because the time maintenance system stores an indication of the rule used to convert the date and time to the common time zone, the time maintenance system can identify those dates and times that need updating when that rule is overridden. Thus, when a new rule overrides an existing rule, the time maintenance system can automatically update dates and times affected by the new rule so that the stored dates and times are in accordance with the new rule.

In some embodiments, the time maintenance system may allow an administrator of a business application to customize how dates and times are processed. For example, the time maintenance system may allow the administrator to specify a common time zone other than GMT or UTC. For example, an organization that is headquartered in New York City may specify the Eastern time zone as a common time zone. In such a case, the time maintenance system may use conventional rules to convert a date and time to GMT and then use the rule for the Eastern time zone to convert from GMT to the common time zone. As another example, the time maintenance system may allow an administrator to customize how a specific date and time field is to be displayed to a user. The time maintenance system may give the administrator the option to specify that a date and time are to be displayed in the local time zone of the user or in the common time zone.

In some embodiments, the time maintenance system may also allow an existing business application that may or may not account for time zone differences to upgrade its dates and times to support subsequent changes in rules. Since the tables of an organization may include millions of entries or rows with dates and times, it would be possible—albeit very time consuming—for the time maintenance system to individually retrieve each record of each table and to upgrade the date and time by adjusting the date and time and storing an identification of the rule in the table. To avoid the overhead of individually retrieving each entry, the time maintenance system may define a new table corresponding to an overriding rule. The new table may contain a row for the first of the year to the start of daylight saving time, a row for the start of daylight saving time to the start of standard time, and a row for the start of standard time to the end of the year. Each row would contain the adjustment to be made to dates and times that fall with the row. The time maintenance system would then form a join of a data table of the business application to the new table using the database management system of the business application. The time maintenance system would then use a set operation of the database management system to upgrade the dates and times based on the adjustments of the joined rows. In this way, the time maintenance system can avoid a separate database retrieve-and-store request for each entry of each table of the business application.

In some circumstances, the time maintenance system may encounter tables of a business application that store only dates. For example, a customer order database may have a shipment table that includes an anticipated shipment date. To handle date-only fields and date and time fields consistently, the time maintenance system may convert date-only fields to date and time fields with the time set to 12 a.m. A difficulty with such an approach, however, is that if such a date and time field is later updated, the date and time of 12 a.m. might be updated to 11 p.m. with the previous date. Such an update of the date to the previous date would be incorrect when the date and time were upgraded from a date-only field. To help avoid this incorrect result, the time maintenance system may, when upgrading a date-only field, set the time of the corresponding date and time field to 12 p.m. As a result, when the date and time field is subsequently updated based on a new rule, it would be unlikely that the update would result in a change in the date—thus, the date would remain the same as the original, non-upgraded date-only field.

FIG. 1 is a block diagram that illustrates the components of the time maintenance system in some embodiments. The time maintenance system 100 may include time maintenance components 110 that interface with a business application 120. The business application is used to store and retrieve data from data tables 121. The time maintenance system may also include a rules table 130. The rules table may contain a time zone rule for each year for each time zone. The rules table may correspond to the information of the Olson database. The time maintenance components may include a store date-time component 111, a retrieve date-time component 112, an update date-time component 113, and an upgrade table component 114. The store date-time component may be invoked by the business application to store dates and times in the data tables that have been converted to a common time zone along with the identification of the rule used for the conversion. The retrieve date-time component may be invoked by the business application to retrieve dates and times from the data tables and convert them to a designated time zone of a user. The update date-time component is invoked to update the data tables when a time zone rule has been overwritten. The upgrade table component is invoked to upgrade the data tables to include a date and time along with identification of a rule.

FIG. 2 is a diagram that illustrates the data of the rules table of the time maintenance system in some embodiments. The rules table 200 includes a row for each combination of a time zone and a year. In this example, row 201 contains the rule for the Eastern time zone of the United States for 2007, and row 202 contains a rule for the Eastern time zone of the United States for 2006. Row 201 corresponds to the rule for extended daylight saving time of 2007 indicating that standard time starts on Sunday, Nov. 4, 2007 and 2 a.m. with an offset of −5 hours from GMT and that daylight saving time starts on Sunday, Mar. 11, 2007 at 2 a.m. with an offset of −4 hours. Row 202 corresponds to the rule for non-extended daylight saving time of 2006 indicating that standard time starts on Sunday, Oct. 29, 2006 at 2 a.m. with an offset of −5 hours and that daylight saving time starts on Sunday, Apr. 2, 2006 at 2 a.m. with an offset of −4 hours. Each row may include a unique rule identifier to identify each rule that is used to convert a date and time to a common time zone. The rules table also contains a row for each overridden rule. Thus, the rules table would contain a row for the non-extended time zone rule for the Eastern time zone for 2007.

The computing device on which the time maintenance system is implemented may include a central processing unit, memory, input devices (e.g., keyboard and pointing devices), output devices (e.g., display devices), and storage devices (e.g., disk drives). The memory and storage devices are computer-readable media that may be encoded with computer executable instructions that implement the time maintenance system, which means a computer-readable medium that contains the instructions. In addition, the instructions, data structures, and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the time maintenance system may be implemented in and used with various operating environments that include personal computers, server computers, hand-held or laptop devices, multiprocessor systems, microprocessor-based systems, programmable consumer electronics, digital cameras, network PCs, minicomputers, mainframe computers, computing environments that include any of the above systems or devices, and so on.

The time maintenance system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 3:
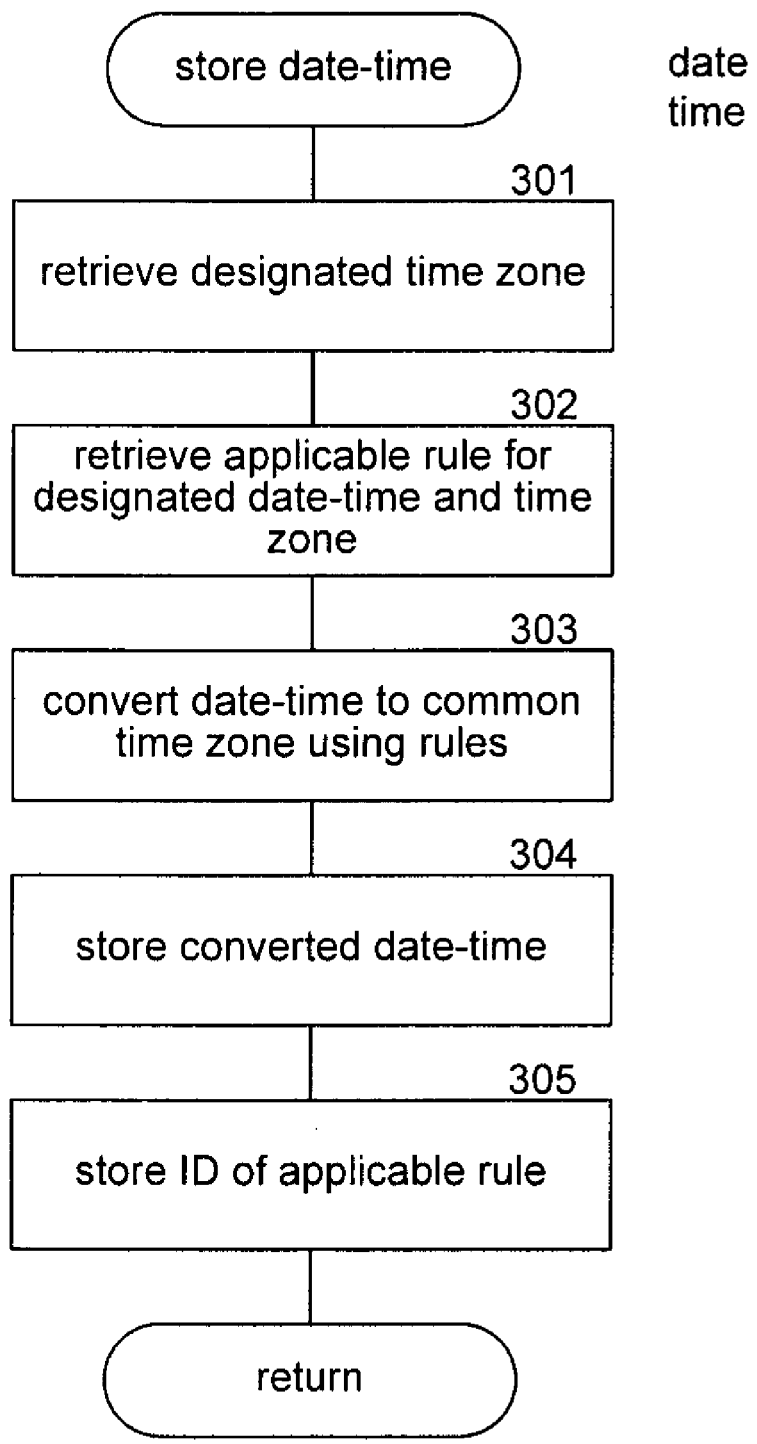
FIG. 3 is a flow diagram that illustrates the processing of the store date-time component of the time maintenance system in some embodiments.

FIG. 3 is a flow diagram that illustrates the processing of the store date-time component of the time maintenance system in some embodiments. The component receives a date and time and stores a converted date and time along with the identification of the applicable rule used to convert. In block 301, the component retrieves the designated time zone for the user. In block 302, the component retrieves from the rules table the applicable rule for the date and time and designated time zone. The applicable rule is the current rule for the year of the received date and for the designated time zone. For example, a current rule for the Eastern time zone for the year 2007 prior to the adoption of extended daylight saving time in the United States would have been the non-extended daylight saving time rule. However, if the rules table is updated after the adoption of the extended daylight saving time, then the current rule for the Eastern time zone for the year 2007 would be the extended daylight saving time rule. In block 303, the component converts the received date and time to the common time zone using the applicable rule. For example, to convert to GMT using the extended daylight saving time rule for the Eastern time zone for 2007, the component would add an offset of −4 hours for all dates and times starting at 2 a.m. on Mar. 11, 2007 and continuing until 2 a.m. on Nov. 4, 2007. In block 304, the component stores the converted date and time in a row of the data table of a business application. In block 305, the component stores the identifier of the applicable rule in the same row of the data table of the business application.

Figure 4:
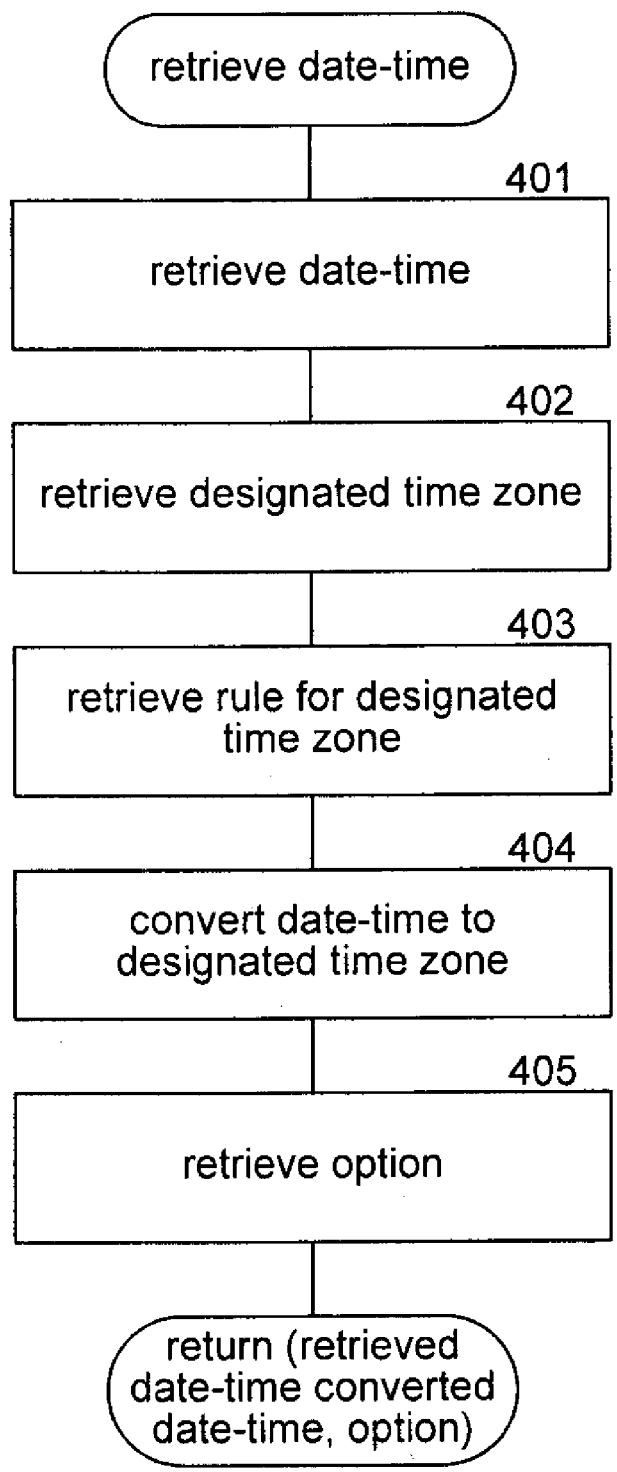
FIG. 4 is a flow diagram that illustrates the processing of the retrieve date-time component of the time maintenance system in some embodiments.

FIG. 4 is a flow diagram that illustrates the processing of the retrieve date-time component of the time maintenance system in some embodiments. The component retrieves a date and time from a row of a data table of the business application and converts it to a date and time for a designated time zone. In block 401, the component retrieves the date and time from a row of a data table. In block 402, the component retrieves a designated time zone of the user. In block 403, the component retrieves the current rule for the designated time zone for the year of the retrieved date. In block 404, the component converts the date and time to the designated time zone. In block 405, the component retrieves an option indicating how to display the date and time for the data table. The option indicates whether to display the date and time in the designated time zone or in the common time zone. The component then returns the retrieved date and time, the converted date and time, and the option.

Figure 5:
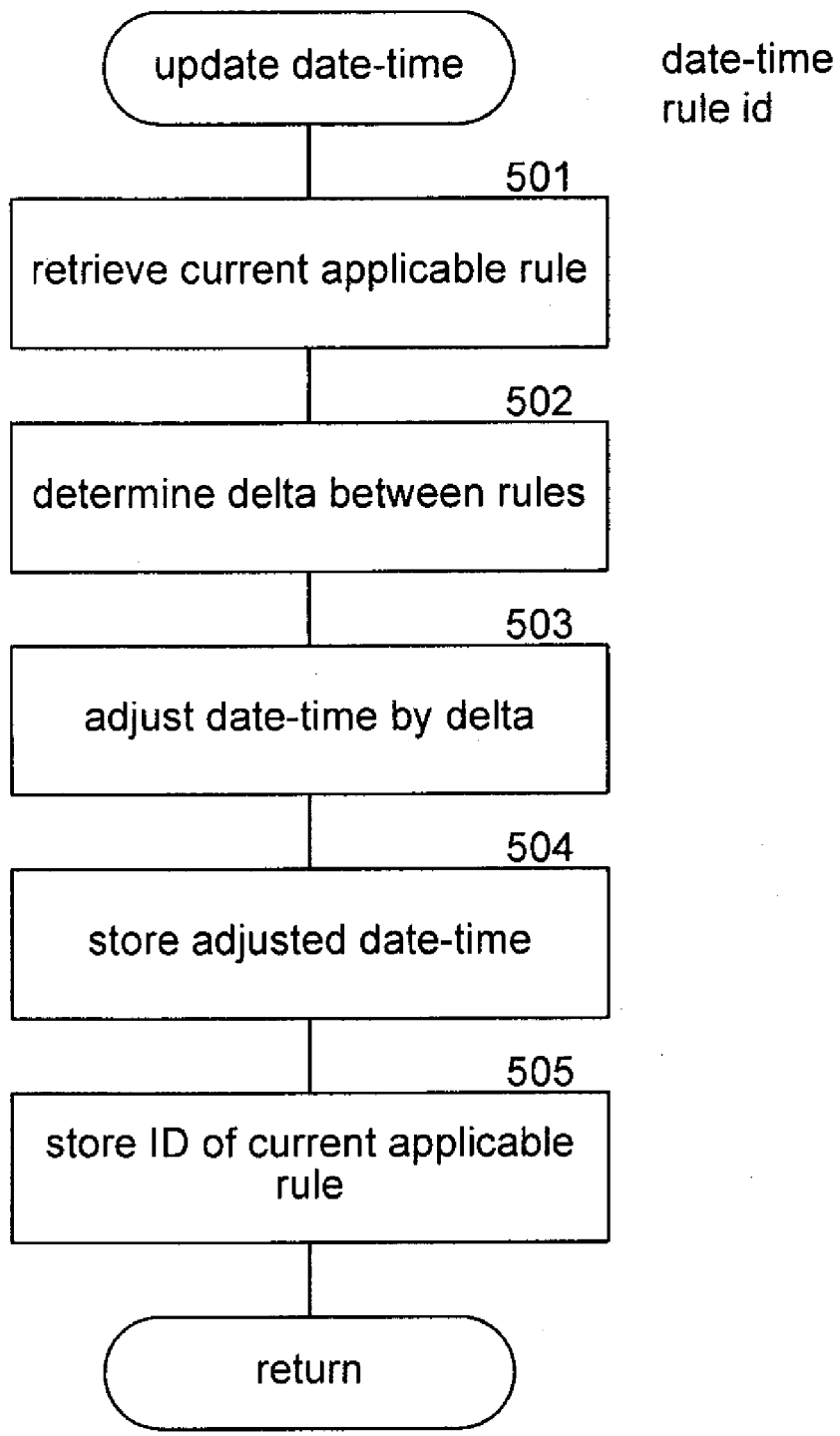
FIG. 5 is a flow diagram that illustrates the processing of the update date-time component of the time maintenance system in some embodiments.

FIG. 5 is a flow diagram that illustrates the processing of the update date-time component of the time maintenance system in some embodiments. The component is passed a date and time along with the identifier of the rule used to convert the date and time to the common time zone. The component stores an updated date and time along with the current applicable rule. In block 501, the component retrieves the current applicable rule for the date and time for the time zone indicated by the passed rule identifier. For example, if the passed rule identifier indicates the non-extended daylight saving time rule for the Eastern time zone for 2007, then the applicable rule would be the extended daylight saving time rule for the Eastern time zone for 2007. In block 502, the component determines the delta needed to adjust between the current applicable rule, which is the overriding rule, and the passed rule, which is the overridden rule. In block 503, the component adjusts the date and time by the delta. In block 504, the component stores the adjusted date and time. In block 505, the component stores the identifier of the current applicable rule and then returns.

Figure 6:
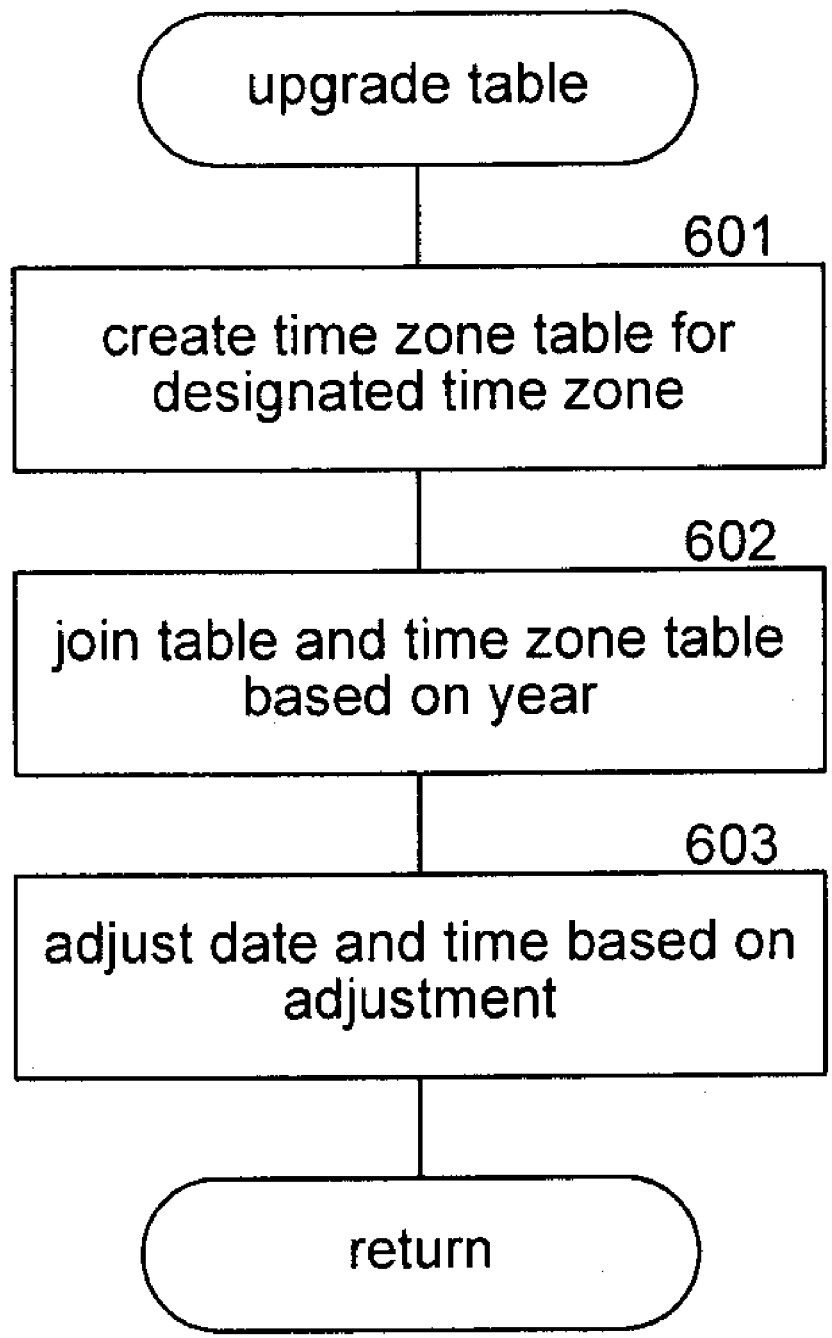
FIG. 6 is a flow diagram that illustrates the processing of the upgrade table component of the time maintenance system in some embodiments.

FIG. 6 is a flow diagram that illustrates the processing of the upgrade table component of the time maintenance system in some embodiments. The component converts the existing dates and times of data tables to the common time zone and adds the identifiers of the rules used in the conversions. In block 601, the component creates a time zone table for a designated time zone of the user. The time zone table may contain three rows for each year for the designated time zone. Each row specifies the effective range within that year for a period of standard time or daylight saving time and an adjustment for upgrading. In block 602, the component joins the time zone table with a data table based on the year and date and time of each row of the data table. In block 603, the component, using a set operation of the database management system, adjusts the date and time in the row based on the joined row of the time zone table and stores an identifier of the rule in the row. The component then returns.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method in a computing device for maintaining date and time information, the method comprising:
   providing an indication of a designated time zone;
   providing rules for converting a date and time from various time zones to a common time zone;
   receiving a date and time in the designated time zone;
   converting the received date and time to a date and time of the common time zone based on a provided rule for the designated time zone;
   storing the converted date and time along with an indication of the rule used to convert the date and time from the designated time zone to the common time zone;
   receiving an indication of an overriding rule that overrides an existing rule for converting a date and time between the designated time zone and the common time zone; and
   when the stored indication indicates that the rule used to convert the stored date and time is the overridden rule, updating the stored date and time based on the overriding rule and storing an indication of the overriding rule.

2. The method of claim 1 wherein the common time zone is the Coordinated Universal Time.

3. The method of claim 1 wherein the common time zone is a specified local time zone.

4. The method of claim 1 wherein the rules for converting a date and time from the designated time zone to a common time zone specify the start date and end date for daylight saving time.

5. The method of claim 4 wherein each rule indicates an applicable year.

6. The method of claim 1 wherein each rule has a unique identifier and the stored indicator of the rule used to convert the date and time is the unique identifier.

7. The method of claim 1 including retrieving the stored date and time and retrieving a local time zone, retrieving an applicable rule for the retrieved date and time, and converting the retrieved date and time from the common time zone to the local time zone using the retrieved applicable rule.

8. The method of claim 1 wherein a stored date and time value has an associated option indicating whether to display in a local time zone or in the common time zone.

9. The method of claim 1 including upgrading a date and time stored in a local time zone by converting the date and time to a common time zone.

10. The method of claim 9 wherein the upgrading includes joining a data table with date and time values in the local time zone to a time zone table with effective dates and times for standard time and daylight saving time along with offsets to the common time zone.

11. A computer-readable medium containing instructions for controlling a computing device to maintain date and time information, the instructions implementing a method comprising:
   providing a rule for converting a date and time from a designated time zone to a common time zone;
   receiving a date and time in the designated time zone;
   converting the received date and time in the designated time zone to a date and time in the common time zone based on the provided rule; and
   storing the converted date and time along with an indication of the rule used to convert the date and time; and
   receiving an indication of a overriding rule that overrides an existing rule for converting a date and time between the designated time zone and the common time zone, and when the stored indication indicates that the rule used to convert the stored date and time is the overridden rule, updating the stored date and time based on the overriding rule and storing an indication of the overriding rule.

12. The computer-readable medium of claim 11 wherein the common time zone is the Coordinated Universal Time.

13. The computer-readable medium of claim 11 wherein the common time zone is a specified local time zone.

14. The computer-readable medium of claim 11 wherein rules for converting a date and time from the designated time zone to a common time zone specify the start date and end date for daylight saving time.

15. The computer-readable medium of claim 11 wherein each rule has a unique identifier and the stored indicator of the rule used to convert the date and time is the unique identifier.

16. The computer-readable medium of claim 11 including retrieving the stored date and time and retrieving an indication of a local time zone, retrieving an applicable rule for the retrieved date and time and the local time zone, and converting the retrieved date and time to the local time zone using the retrieved applicable rule.

17. A computing device for maintaining date and time information, comprising:
   a data store having an indication of a designated time zone and rules for converting a date and time from various time zones to a common time zone;
   a component that converts a date and time input in the designated time zone to a date and time in the common time zone based on the provided rules;
   a component that stores the converted date and time along with an indication of the rule used to convert the date and time for the designated time zone to the common time zone; and
   a component that receives an indication of an overriding rule that overrides the rule used to convert the date and time from the designated time zone to the common time zone and that updates the stored date and time based on the overriding rule and storing an indication of the overriding rule.

18. The computing device of claim 17 wherein the rules for converting a date and time from a time zone to a common time zone specify the effective dates and times for daylight saving time and standard time for the time zone.

19. The computing device of claim 17 wherein each rule has a unique identifier and the stored indication of the rule used to convert the date and time is the unique identifier.

\* \* \* \* \*